July 25, 1939. A. NUTTING 2,167,283
AIR FILTER LINT SCREEN
Filed April 4, 1938 2 Sheets-Sheet 1
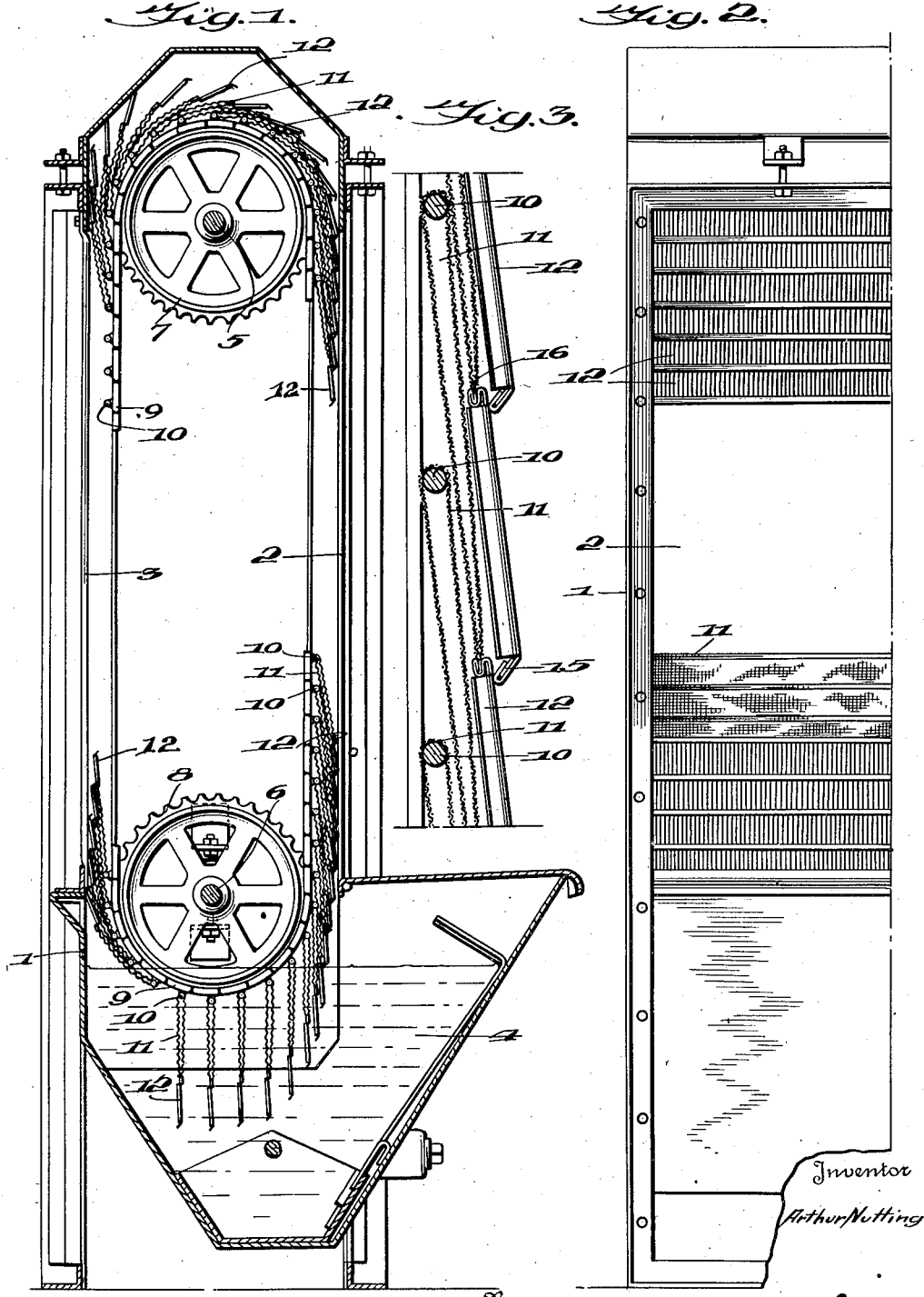

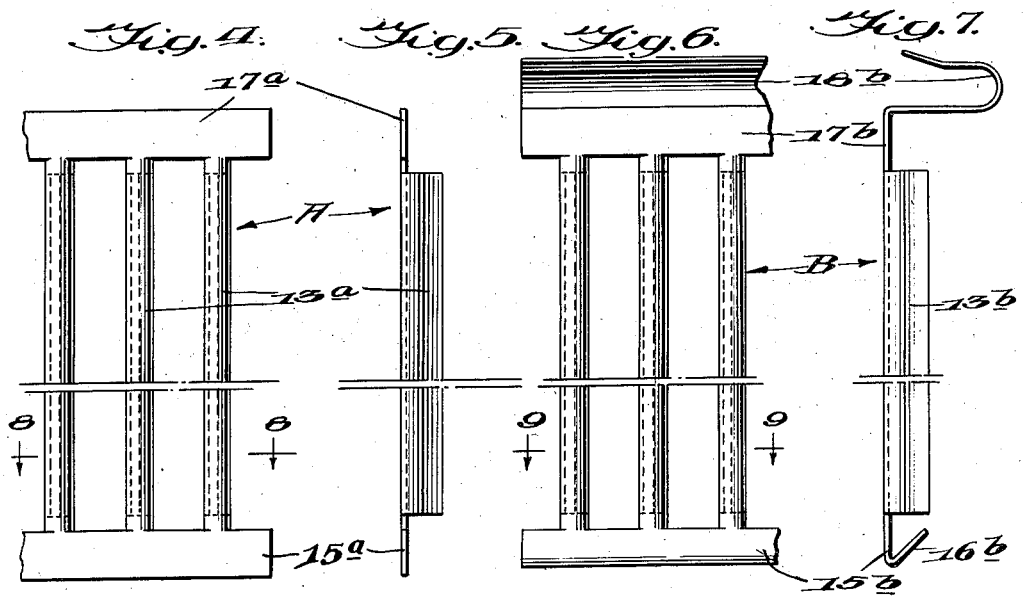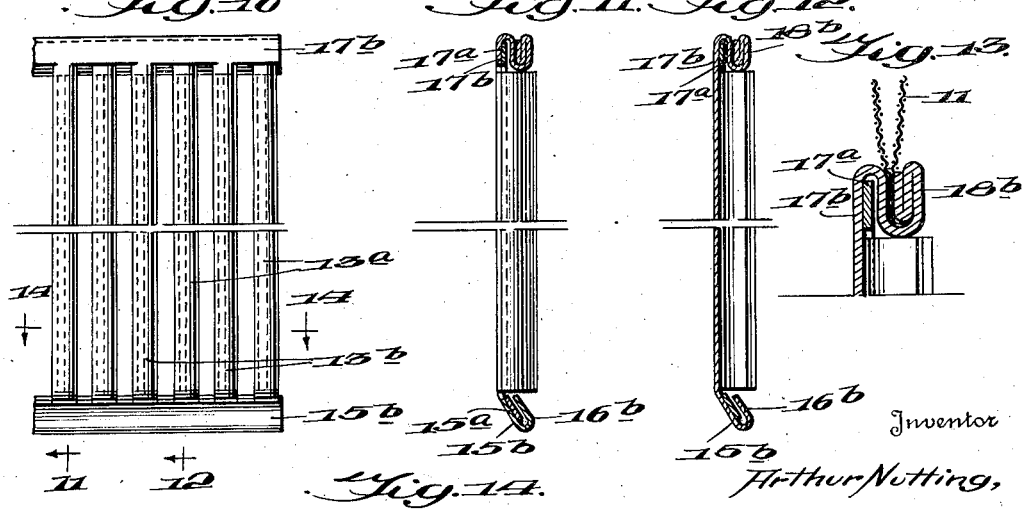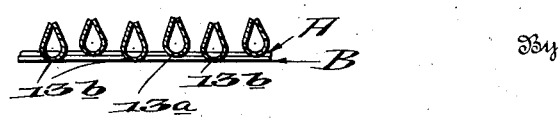

Patented July 25, 1939

2,167,283

UNITED STATES PATENT OFFICE 2,167,283

AIR FILTER LINT SCREEN

Arthur Nutting, Louisville, Ky., assignor to American Air Filter Company, Inc., Louisville, Ky., a corporation of Delaware Application April 4, 1938, Serial No. 199,849

3 Claims. (Cl. 183—62)

In automatic viscous impingement air filters of the overlapping panel type, an endless succession of rectangular wire panels or screens are pivotally secured, along one horizontal edge, to an endless upright conveyor to form a filtering belt or curtain, which extends vertically across the air flow with its lower end submerged in oil. The panels, in the air flow, are slanted in overlapping contacting relation, while those in the oil bath hang straight downwardly in separated relation. The overlapping of the panels in the air flow effectively builds up an efficient air filtering medium, while their subsequent separation in the oil bath thoroughly exposes them to the cleaning action of the oil.

Despite the thorough exposure of the panels during the filter cleaning operation, it has been found that the deposits of lint on the panels are not effectively removed. Consequently, as use continues, the lint deposits "grow", ultimately restricting the flow of air sufficiently to require the entire removal of the panels for replacement or manual cleaning purposes. The lint problem has been an exceedingly troublesome one in all types of viscous impingement filters and, although necessarily given considerable attention, no simple, practical and effective way, either to overcome it or even substantially delay its effect, has heretofore been found.

The principal object of the present invention is to overcome the lint problem or at least substantially delay its effect in a simple, practical and effective manner.

I have found that such objective can be attained by interposing, between the incoming air and the filter medium, a supplemental screen composed of smooth surfaced parallel rods defining narrow elongated openings or slots, in which the width of the slots and the circumferential or peripheral dimension of the rods between slots are both coordinated to the length of the lint particles. While lint particles vary in length, most of them will range between one and three sixteenths of an inch. Accordingly, the slot is made narrow enough to insure contact between most of the lint particles and the screen, while the circumference of the rods is made large enough to prevent any substantial proportion of the particles from completely encircling a rod. A screen of this character not only removes substantially all of the troublesome lint, but provides a surface with which the lint cannot very well become entangled and from which it is readily removed when submerged in oil.

Another object, therefore, is to provide a supplemental or lint screen which is effectively coordinated to the length of the troublesome lint particles.

A further object is to provide a simple inexpensive lint screen which can be readily attached to the panels of the overlapping panel type of filter, and which, when attached, will effectively protect such panels against troublesome deposits of lint.

While the invention is generally useful, it is particularly adapted for application of the overlapping panel type of air filter and is, therefore, illustrated in the accompanying drawings as applied to such type. In such drawings:

Figure 1 is a vertical sectional view of an overlapping panel type of filter, with a lint screen applied;

Figure 2 is a partly broken elevational view of that face of the filter which appears at the right in Figure 1;

Figure 3 is an enlarged fragmentary sectional view taken through a few overlapping panels;

Figures 4–7 inclusive, are enlarged front and side elevations of separate parts of a lint screen, Figures 4 and 5 being respectively front and side views of one part, and Figures 6 and 7 being similar views of another part;

Figures 8 and 9 are sectional views respectively taken on line 8—8 of Figure 4, and line 9—9 of Figure 6;

Figure 10 is a front elevation of an assembled lint screen;

Figures 11 and 12 are vertical sections taken on lines 11—11 and 12—12 of Figure 10;

Figure 13 is an enlarged detailed view showing the manner of attaching the screen to a panel; and Figure 14 is a horizontal section taken on line 14—14 of Figure 10.

The overlapping panel type of filter which is conventionally illustrated in the drawings comprises: a casing 1 having a front inlet opening 2, a rear outlet opening 3 and a bottom oil bath 4; an upright conveyor having an upper shaft 5, a lower shaft 6, spaced upper sprockets 7, spaced lower sprockets 8, a conveyor chain 9 for each pair of opposed upper and lower sprockets, only one chain and one opposed pair of sprockets being shown, and an endless series of rods 10 extending between and secured to the chains 9; and a filter medium composed of an endless succession of rectangular wire panels or screens 11, each of which is folded over a rod 10 and thus pivotally secured to the conveyor chains 9.

In practice, the conveyor is usually moved intermittently, about ¾" every twelve minutes in the direction indicated, by a suitably controlled drive mechanism not shown. At the bottom of the conveyor, the panels 11 hang straight downwardly into the oil bath in separated relation. As they emerge from the bath, they slowly swing about the rods 10 and are thus ultimately made to extend in overlapping contacting relation, slanting downwardly during their upward travel along the front or inlet pass and slanting upwardly during their downward travel along the back pass. While the extent to which each panel overlaps succeeding panels will depend upon the filtering thickness desired, good results can ordinarily be obtained by making each panel overlap the space between its own rod 11, and the next four to six rods 11. With a panel overlapping the space between its own rod and the next four rods, such panel will overlap three-fourths of the face area of the following panel and, in turn, will have three-fourths of its own face area overlapped by the preceding panel so that only one-fourth of its face area will be exposed. It is this exposed part that has been particularly subjected to deposits of lint.

In accordance with my invention, the exposed portion of one panel is protected from lint deposits by covering it with a lint screen 12, and this is preferably accomplished by attaching the lint screen to the free edge of the preceding panel. The lint screen is preferably of grid form, having rods 13 spaced to form narrow elongated openings or slots 14 (see Figure 10). The slots 14 may be as long as required, but their width should be made as narrow as possible without substantially obstructing the air flow. While the width of the slots will depend to some extent upon the width of the rods, which should be minimized, excellent results can ordinarily be obtained by making the slots approximately one-sixteenth of an inch wide, since, at that width, lint particles of a corresponding or greater length will be effectively caught on the screen.

The width of the rods should be minimized in order to maximize the number of slots and thus maintain the maximum free air flow area. At the same time, the circumferential and peripheral dimension of the rods should be made great enough to prevent any appreciable amount of deposited particles from encircling the bars sufficiently to render removal difficult. This condition will ordinarily be met with rods having a circumferential dimension not substantially less than three-sixteenths of an inch, since that is the length of the bulk of the longer lint particles normally encountered in atmospheric air. In this connection, it may be noted that good results can be obtained with vertical wires one-sixteenth of an inch in diameter and spaced to define vertical slots one-sixteenth of an inch wide. The circumference of such wires is slightly over three-sixteenths of an inch, and such dimension was found, in use, to be amply sufficient to prevent entanglement.

For the sake of lightness, convenience and economy, however, a lint screen structure, as shown in Figures 4-14 inclusive, is preferred. The lint screen there shown includes two parts generally designated A and B. The A part is shown in Figures 4, 5 and 8, the B part in Figures 6, 7 and 9, and both parts in the remaining Figures 10 to 14 inclusive.

The A part is made by stamping a thin, smoothly surfaced sheet of metal to form a series of spaced parallel rods 13a, having their corresponding ends connected together by flat margins 15a and 17a. Each rod 13a is preferably provided with a stream-line shape, that is to say, with a rounded front face which terminates in rearwardly converging side faces. The circumferential dimension of the rods is $\frac{3}{16}$ of an inch, the width of the rods $\frac{3}{32}$ of an inch, and the spacing between rods or the width of the slot delimited by them $\frac{3}{32}$ of an inch. These dimensions are approximate, being given for illustrative and not limiting purposes.

The B part is similarly made by stamping another sheet to form correspondingly dimensioned and spaced streamlined rods 13b, having flat margins 15b and 17b. In addition, however, the margin 15b of this plate is provided with an inwardly turned flange 16b, while its other margin 17b is provided with a reversely curved U-shaped flange 18b.

The two parts A and B are placed together with the A part arranged within the B part, and with their rods 13a and 13b offset from each other to provide the slots 14. The two parts, thus arranged, may be secured in any suitable manner, as by bending the flange 16b to lock the margins 15a and b together and by bending the flange 18b to lock the margins 17a and b together.

The margins 15a and b and the flange 16b form the free edge or lip of the lint screen proper. For the sake of clearness, this lip is hereinafter referred to as the lip 15 of the lint screen and so designated in Figure 3. The lip 15 preferably is bent inwardly so as to slant under the lint screen 12 for a purpose later described.

The reversely curved or U-shaped flange 18b provides a recess into which the free edge of a filtering panel 11 may be inserted and within which it may be secured by bending the sides of the U together, as shown in Figure 13, so as to attach the lint screen 12 securely to the filtering panel 11. The margins 17a and b and the flange 18b thus form the attached margin of the lint screen 12. For the sake of clearness, it is hereinafter referred to as the attached margin 17 of the lint screen and so designated in Figure 3.

When attached, the lint screen 12 on one panel 11 completely overlaps the normally exposed portion of the succeeding panel 11. In addition, the inwardly turned lip 15 contacts the attached margin 17 of the succeeding lint screen so as to prevent the passage of air between lint screens instead of through them. With the foregoing arrangement, all incoming air must necessarily pass through the lint screens 12. Consequently, these screens are subjected to dust of a granular as well as a linty nature. The lint screens 12 are not particularly effective in the removal of granular dust, but they have proven to be extremely effective in the removal of lint. Inasmuch as the particles, which form the bulk of the lint encountered in atmospheric air, are not of a length sufficient to encircle the surfaces provided by the lint screen, they cannot very well become entangled upon such surfaces.

Furthermore, since the surfaces of the lint screen are smooth, the lint will not adhere thereto except as a result of the binding action of the oil. As a consequence, when the lint screen reaches the oil bath, the particles will be easily washed therefrom. While the rods of the lint screen may be horizontally arranged, their vertical arrangement is preferred. With horizontal rods, there may be a tendency for some of the lint to drape over the upper side of each rod and remain there upon the emergence of the screen, but with a lint screen having vertical rods and horizontal margins, this tendency is defeated at all points except at the margins, where the available "draping" area is relatively insignificant.

Having described my invention, I claim:

1. In an air filter: a support; an endless series of air filter panels, each pivotally suspended in air filtering position from said support to overlie and contact with a portion of the next adjacent panel, leaving another portion thereof exposed; and a lint screen attached to the free end of each of said panels to overlie the exposed portion of the next adjacent panel.

2. The structure of claim 1, wherein said lint screen comprises: a grid plate having a series of spaced parallel rods defining elongated slots; a similar grid plate also having a series of spaced parallel rods to define elongated slots; and means securing said plates together in overlapping relation with the rods of one plate arranged parallel to but offset from the rods of the other plate, the rods of both plates jointly cooperating to define a series of narrow elongated slots.

3. In an air filter of the overlapping panel type, wherein an endless succession of air filtering panels are pivotally secured to an endless upright conveyor to form a viscous impingement air filtering belt extending vertically across the air flow and having its lower end submerged in oil, the panels in the air flow being slanted in overlapping contacting relation and those in the bath hanging downwardly in separated relation, the combination of a lint screen to cover the exposed portion of each panel and means for securing said screen to the next adjacent overlapping panel.

ARTHUR NUTTING.